2,809,894

GEL-FORMING COMPOSITION AND METHOD OF PRODUCING THE SAME

Arthur E. Poarch, Mill Valley, and George W. Twieg, Gustine, Calif., assignors to Avoset Company, San Francisco, Calif., a corporation of Delaware No Drawing. Application June 15, 1955, Serial No. 515,765

14 Claims. (Cl. 99—132)

This invention relates to an improved gel-forming composition, and more particularly to an improved gel-forming composition of the dessert type comprising low methoxyl pectin and a salt of an alkaline earth metal adapted to quickly form an edible gel having excellent textural properties by the mere addition of cold water thereto.

In our United States Patent No. 2,701,767, issued February 8, 1955, we disclosed an edible gel-forming composition of the dessert type comprising low methoxyl pectin and a calcium salt, with said composition having the property of being able to quickly form a gel having a satisfactory texture upon being added to cold water. Prior to the invention described in this patent, it was necessary, in order to form a satisfactory gel, to either add the total composition to hot water and then allow the mixture to cool and set, or it was necessary to get the low methoxyl pectin totally into solution in cold water before the calcium salt reactant was added thereto.

As is brought out in our mentioned patent, we were able to obtain a satisfactory one package cold water gel-forming composition of the low methoxyl pectin type by modifying the low methoxyl pectin constituent and by either selecting a calcium salt of extremely limited solubility or by coating the calcium salt selected so as to delay its solution. It was important, from the standpoint of obtaining a satisfactory final gel, that the low methoxyl pectin be modified by dissolving it together with a monovalent metal salt of a weak acid and/or a monovalent metal salt of either the complex acids of phosphorous or of ethylene diamine tetra acetic acid, and to then dry this solution to obtain the solute. While the final gel-forming composition containing the modified low methoxyl pectin produced a satisfactory gel, we have now discovered how to modify the gel-forming composition so that the final gel will have improved properties from the standpoints of strength, palatability, and resistance to bleeding.

Simply stated, the improved gel-forming composition of the present invention is based upon the concept that it is important not only to control the initial rates of solution and reaction of the low methoxyl pectin and the source of polyvalent ions, i. e. calcium salt, but it is also important that the rate of release and the reactivity rate of the calcium ions be controlled over a considerable period of time after the modified low methoxyl pectin has been completely dissolved in the water. We now know that such long term control of the rate of release and the rate of reactivity of the calcium ions will result in the obtaining of certain practical improvements in the physical qualities of the gel resulting from the reaction, among which qualities are the following: the textural palatability of the gel; the unchanging nature of the gel texture after the gel has been allowed to stand for relatively long periods of time; a reduced tendency for the gel to bleed, or exude fluid, upon standing; a higher cohesive strength; and a greater tolerance of the gel for acidic additives, such as acid fruits or acid fruit juices. Additionally, this long term timing control of the reaction enables a more efficient utilization of the constituents of the gel-forming composition, thus effecting economies of the materials used.

We have observed, by way of supporting our present concept, that it is important to have a long term control of the rate of solution and reaction of the calcium salt in order to obtain optimum gel properties, that if a solution of low methoxyl pectin is first prepared and then a solution containing sufficient calcium ions to cause gelation of the pectin is added to the low methoxyl pectin solution, the resulting gel tends to have a certain brittleness or roughness of texture which impairs its palatability. Also, the resulting gel tends to bleed, or exude fluid, on standing, thus impairing its appearance. It is believed that these properties result from a non-selective type of reaction between the low methoxyl pectin and calcium ions. It is believed that when calcium ions are present in sufficient number to induce gelation the indiscriminate reaction between the pectin and calcium ions results in a final gel having a greater proportion of branch, or cross-linked, chain polymers than straight chain polymers, and that the straight chain polymers are relatively short in length. On the other hand, it is believed, and this is consistant with the theory of polymer formation, that when the concentration of available calcium ions is kept low in relation to the concentration of low methoxyl pectin molecules, this favors the formation of straight chain polymers of considerable length, and such polymers result in a gel which is more elastic, smoother and more cohesive than the gel resulting from a preponderance of branched, or cross-linked, polymer chains of shorter length.

Our present concept, therefore, is to improve the physical properties of the final gel by releasing the calcium ions slowly and evenly for some period of time after solution of the low methoxyl pectin, so that as the reaction proceeds and polymer formation takes place there will always be a minor proportion of calcium ions in solution as compared to the amount of low methoxyl pectin molecules in solution. The essential object of the invention is to provide a gel-forming composition whereby this concept may be carried out.

In obtaining the improved gel-forming composition of the present invention, we first modify the low methoxyl pectin along the lines taught in U. S. Patent No. 2,701,767.

The preferred manner of modifying the pectin is to form a viscous solution of the pectin, sodium hexametaphosphate and sodium citrate, and to then spray dry this solution so as to obtain a solute mixture having substantially the following composition:

|  | Percent |
|---|---|
| Low methoxyl pectin | 74 |
| Sodium hexametaphosphate | 19 |
| Sodium citrate | 7 |

The low methoxyl pectin material which we have employed is produced by the California Fruit Growers Exchange of Ontario, California, according to the process set forth in the patent to Bryant 2,480,710. This low methoxyl pectin material is produced by partial demethoxylation with ammonia with an alcoholic system or with concentrated aqueous ammonia. In the process of preparing this material, some of the methoxyl groups are replaced with amide groups rather than free-carboxyl groups, and the end product has been termed to be a pectinic acid amide.

A purpose and object of the present invention is to incorporate this modified low methoxyl pectin in a gel-forming composition which will form a finished gel in cold water in approximately ten minutes. There is no one calcium salt which will enable this to be done and which will still have the properties of solution and reaction rates which we feel are necessary to the obtaining of a gel having the physical properties above mentioned. However, we have found that through the use of a mixture of calcium salts, this ten minute gel-forming time can be attained while still enabling the precise reaction timing required to obtain optimum gel properties.

The calcium salt to be employed in major proportion is heat-treated anhydrous mono-calcium phosphate. Details of the method of producing this salt are disclosed in U. S. Patents 2,160,232 and 2,160,700. This salt is sold under the trademark "V–90."

When a single package gel-forming composition comprising the modified low methoxyl pectin and "V–90" is placed in cold water, it takes approximately 90 seconds before there are enough calcium ions released to begin the gelation reaction. After this 90 second period, it takes approximately 5 minutes before all of the calcium ions are released. With respect to the modified pectin, or pectin factor, substantially all of the factor is in solution before the 90 second initial period has elapsed. When "V–90" is the only calcium salt employed, it enables the attainment of the reaction timing desired for the obtaining of a final gel having optimum physical properties. However, when "V–90" is employed alone, it takes approximately 15 minutes before the final gel product is obtained. Therefore, for the purpose of cutting down the overall gelation time without disturbing the optimum gel properties conferred by the solution and reaction rates of "V–90," one or more additional calcium salts are employed. These additional salts are extremely limitedly soluble in cold water and are used in such minor proportions as to not cause any trouble in the reaction, in the sense of causing premature gelation, within, say the first 3 or 4 minutes of the reaction. The additional calcium salt or salts contribute an increased concentration effect of calcium ion over the period of the reaction, thus shortening the overall reaction time required to the desired value of approximately 10 minutes.

In combination with "V–90," we employ minor proportions of one or more of the following calcium salts:

(1) Anhydrous tricalcium phosphate.

(2) Gypsum.

(3) Gypsum which has been heat-treated at temperatures in excess of about 200° C. in order to retard its rate of solubility.

(4) Gypsum which has been coated with any of various cold water-dispersible materials, such as those set forth in U. S. Patent No. 2,701,767.

(5) Gypsum which has been coated with low methoxyl pectin or a modified low methoxyl pectin, such as that described in U. S. Patent No. 2,701,767 and described herein. Any of several methods of applying this coating may be employed, but the preferred method is that of spray drying a suspension of the gypsum in a solution of the low methoxyl pectin or modified low methoxyl pectin.

(6) Dicalcium phosphate.

Other calcium salts having substantially the same solubility rates and ionizing rates as those above mentioned may be employed provided they are used in minor proportions.

A preferred example of the improved dessert type gel-forming composition of the present invention is as follows:

| | |
|---|---|
| Pectin factor | 5.7 parts. |
| "V–90" | 1.35 parts. |
| Anhydrous tricalcium phosphate | 0.05 part. |
| Pectin-coated gypsum | 0.05 part. |
| Citric acid | 2.5 parts. |
| Sodium citrate | 1.5 parts. |
| Sugar (cane or beet) | 95.0 parts. |
| Natural or artificial flavor | 0–0.1 part (or according to choice.) |
| Food coloring | 0–0.03 part (or according to choice.) |

These constituents are blended together in a powder mixture, and then added to approximately 500 parts by weight of cold water. The resulting mixture is stirred vigorously for about 90 to 120 seconds and then allowed to stand for 6 to 10 minutes. The resulting gel has optimum textural and taste properties.

The citric acid is employed to provide the desired degree of sourness in the final product, and since it has the further effect of providing hydrogen ions which speed up the rate of solution of the various calcium salts, sodium citrate is employed as a hydrogen ion buffering agent. As above stated, the calcium salts, other than "V–90," are employed to enhance the concentration effect of calcium ions over the reaction period and thus shorten the time required to obtain the final gel.

The sugar is added for the taste factor it provides, but due to the amount of sugar used to obtain the desired taste property it may have a reaction time lengthening effect. The flavor and coloring agents have no effect on the time or nature of the reaction.

It is also important, from the standpoint of controlling and properly timing the gel-forming reaction, that the particle sizes of the active constituents of the composition be carefully controlled. The particle size of the pectin factor should be such that the pectin factor powder will pass fully through at least a No. 65 sieve. All of the calcium salts employed should preferably pass through a No. 325 sieve. The particle size of the powdered citric acid should preferably be such that all the particles will pass through a No. 200 sieve. The hydrogen ion buffering agent, sodium citrate, should preferably pass through a No. 325 sieve.

With the citric acid being present in the composition in the required amount to provide the desired degree of sourness in the eventual gel, we have found that the amount of buffer salt, sodium citrate, employed should not exceed approximately 50% of the weight of the pectin factor of the composition. Optimum reaction timing, which leads to the obtaining of optimum gel qualities, is obtained when such a 1:2 ratio between sodium citrate and the pectin factor is not exceeded.

The term "heat-treated anhydrous mono-calcium phosphate" appearing in the appended claims means "V–90."

While a specific example of the subject composition has been set forth, it is to be understood that all substantial equivalents thereof are considered to be within the spirit and scope of the invention.

What is claimed is:

1. A dry powdered mixture adapted to form an edible gel upon the addition thereto of water comprising the solute obtained from an aqueous solution of: a partially demethoxylated pectin, sodium hexametaphosphate, and sodium citrate, said solute being composed of approximately 74% by weight of said pectin, approximately 19% by weight of sodium hexametaphosphate and approximately 7% by weight of sodium citrate; an amount of heat-treated anhydrous mono-calcium phosphate sufficient to react with said pectin to form a gel; an amount of citric acid sufficient to impart a desired sourness taste to the gel to be formed; and sodium citrate in an amount not in excess of half the weight of said pectin.

2. A dry powdered mixture as set forth in claim 1 having the following parts by weight composition: 5.7 parts of said solute, 1.35 parts of said mono-calcium phosphate, 2.5 parts of citric acid, and 1.5 parts of sodium citrate.

3. A dry powdered mixture as set forth in claim 1 comprising, further, a minor amount of a calcium salt which is limitedly soluble in water.

4. A dry powdered mixture as set forth in claim 1, comprising, further, a minor amount of anhydrous tri-calcium phosphate and a minor amount of gypsum having a coating of partially demethoxylated pectin.

5. A dry powdered mixture as set forth in claim 4, said anhydrous tri-calcium phosphate being present in an amount of 0.05 part and said gypsum being present in an amount of 0.05 part.

6. A dry powdered mixture adapted to form an edible gel upon the addition thereto of water comprising 5.7 parts of the solute obtained from an aqueous solution of: a partially demethoxylated pectin, sodium hexametaphosphate, and sodium citrate, said solute being composed of approximately 74% by weight of said pectin, approximately 19% by weight of sodium hexametaphosphate, and approximately 7% by weight of sodium citrate; 1.35 parts of heat-treated anhydrous mono-calcium phosphate; 2.5 parts of citric acid; 1.5 parts of sodium citrate; and about 0.1 part of calcium salt having a very limited solubility in water.

7. A dry powdered mixture adapted to form an edible gel upon the addition thereto of water comprising the solute obtained from an aqueous solution of: a partially demethoxylated pectin, sodium hexametaphosphate and sodium citrate; and heat-treated anhydrous mono-calcium phosphate.

8. A dry powdered mixture as set forth in claim 7 in which the parts by weight ratio of said solute to said mono-calcium phosphate is approximately 4:1.

9. An edible gel comprising the product resulting from the reaction in water of a solute, obtained from the drying of an aqueous solution of partially demethoxylated pectin, sodium hexametaphosphate and sodium citrate, with heat-treated anhydrous mono-calcium phosphate.

10. The edible gel of claim 9, said gel containing 5.7 parts of said solute, 1.35 parts of said mono-calcium phosphate, and comprising, further, 2.5 parts of citric acid, 1.5 parts of sodium citrate, 95 parts of sugar, and minor amounts of flavor and food color agents.

11. The edible gel of claim 10, said solute consisting of about 74% by weight of said pectin, about 19% by weight of sodium hexametaphosphate and about 7% by weight of sodium citrate.

12. The edible gel of claim 11, comprising, further, 0.05 part of anhydrous tri-calcium phosphate and 0.05 part of gypsum coated with partially demethoxylated pectin.

13. A method of forming an edible low methoxyl pectin dessert gel comprising the steps of modifying low methoxyl pectin, to enhance its rate of solubility and to hinder cross-linked polymer formation of the same in the presence of calcium ions, by mixing an amount of said pectin in water along with lesser amounts of sodium hexametaphosphate and sodium citrate and by drying said mixture, mixing with said modified pectin in powdered form an amount of powdered heat-treated anhydrous mono-calcium phosphate sufficient to cause gelation thereof, said mono-calcium phosphate being adapted to have a delayed release of calcium ions therefrom in cold water for a period of between one and two minutes, and adding said mixture to cold water in company with the combination of amounts of a weak acid and a hydrogen ion buffering agent adapted to effect a gradual release of calcium ions into solution over a period of approximately five minutes after said one to two minute period has elapsed, whereby the resulting gel will be dominated by the presence of straight chain polymers rather than by cross-linked polymers.

14. The method of claim 13 wherein: said weak acid is citric acid; and said buffering agent is sodium citrate.

References Cited in the file of this patent

UNITED STATES PATENTS

| | | |
|---|---|---|
| 2,441,729 | Steiner | May 18, 1948 |
| 2,536,708 | Angermeier | Jan. 2, 1951 |
| 2,701,767 | Twieg et al. | Feb. 8, 1955 |